UNITED STATES PATENT OFFICE.

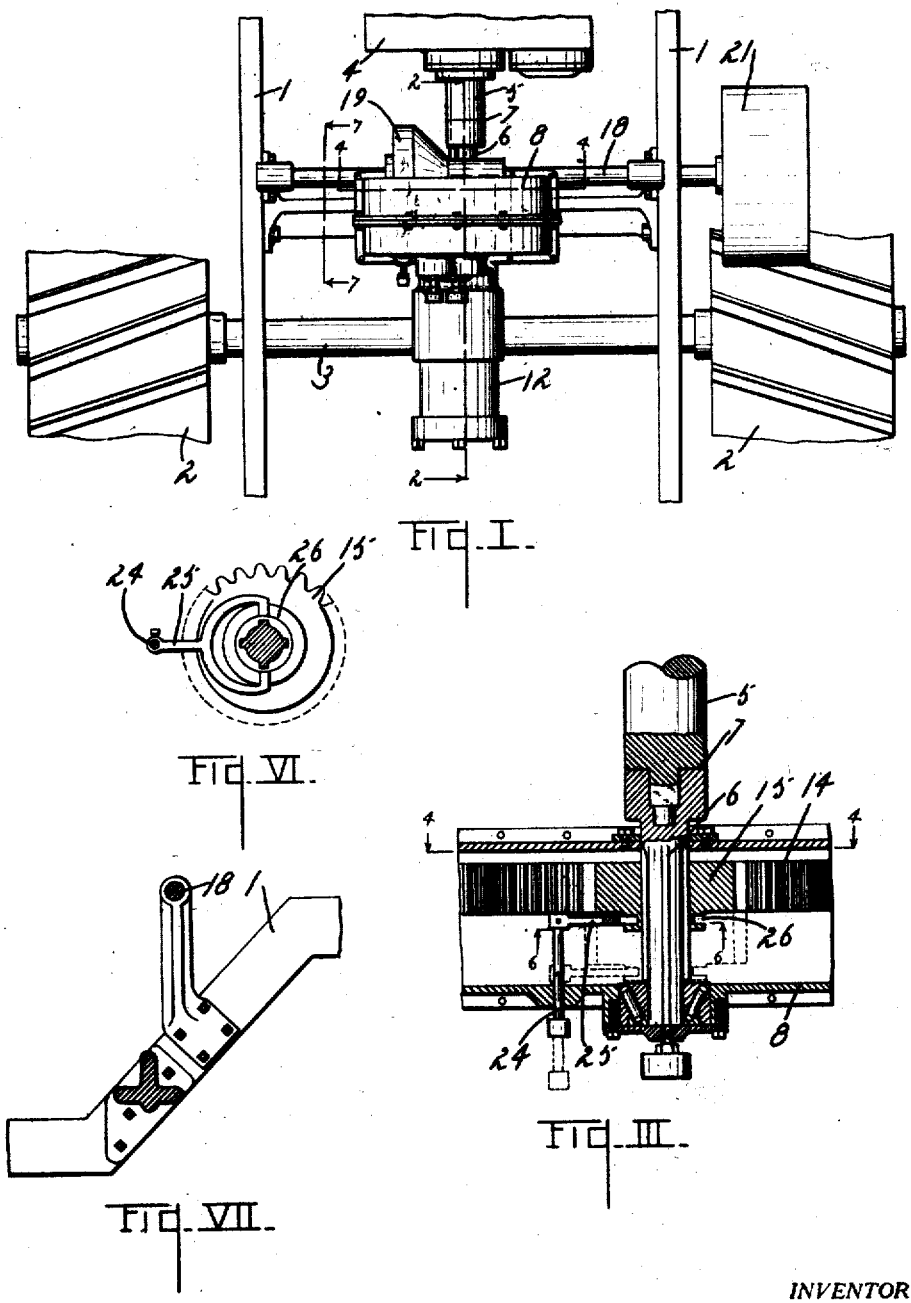

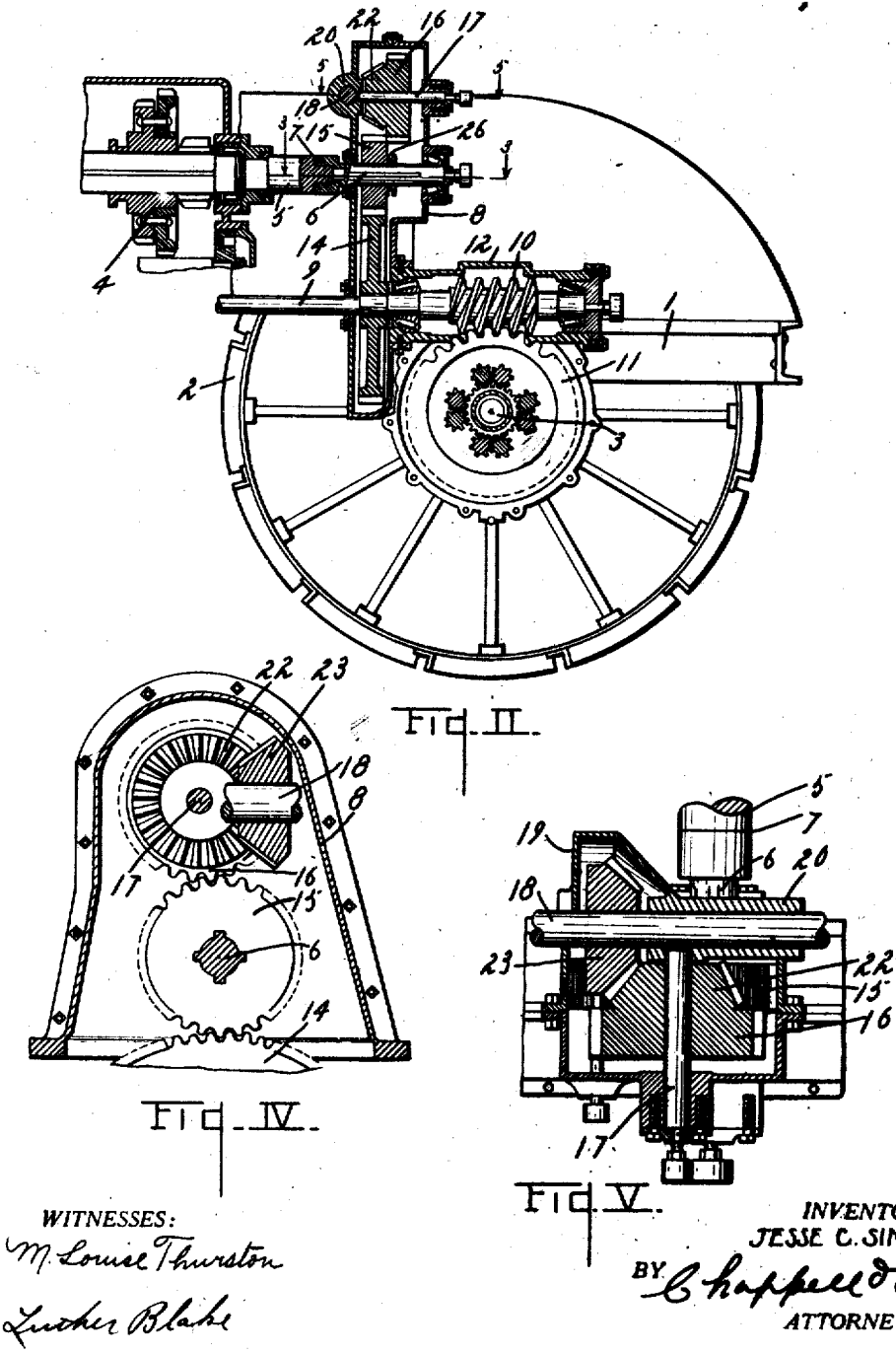

JESSE C. SIMMONS, OF BIG RAPIDS, MICHIGAN, ASSIGNOR TO THE FOUR DRIVE TRACTOR COMPANY, OF BIG RAPIDS, MICHIGAN.

TRACTOR-GEARING.

1,269,755.  Specification of Letters Patent.  Patented June 18, 1918.

Application filed August 28, 1917. Serial No. 188,661.

*To all whom it may concern:*

Be it known that I, JESSE C. SIMMONS, a citizen of the United States, residing at Big Rapids, county of Mecosta, State of Michigan, have invented certain new and useful Improvements in Tractor-Gearing, of which the following is a specification.

This invention relates to improvements in tractor gearing.

The main objects of this invention are:

First, to provide an improved combined tractor gearing and belt pulley driving device.

Second, to provide in a combined tractor gearing and belt pulley driving device an improved driving gear.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention, the engine and various other parts being omitted.

Fig. II is a detail vertical longitudinal section on a line corresponding to line 2—2 of Fig. I.

Fig. III is an enlarged horizontal section on a line corresponding to line 3—3 of Fig. II.

Fig. IV is a detail section on a line corresponding to line 4—4 of Figs. I and III.

Fig. V is a detail view, partially in section, on a line corresponding to line 5—5 of Fig. II.

Fig. VI is a detail vertical section on a line corresponding to line 6—6 of Fig. III, showing details of the shifting means.

Fig. VII is a detail section on a line corresponding to line 7—7 of Fig. I.

In the drawing similar reference characters refer to similar parts throughout the several views, and the sectional views are taken looking in the direction of the little arrows at the ends of the section lines.

Referring to the drawing, 1, 1, represent the sides or longitudinal sills of the running gear frame. The traction wheels 2 are mounted on the axle 3. The engine is not shown, but I preferably employ an internal combustion engine.

The variable speed and reversing gearing 4 is of the shifting gear type, but, as its details form no part of my present invention I do not illustrate the same herein.

The driven shaft 5 of the transmission I herein designate for convenience the power shaft, it being the means through which the power is delivered from the transmission to the pulley shaft and traction wheels. The shaft 5 is provided with an extension 6 connected thereto by the joint 7 which permits a limited lateral movement of the extension, thus avoiding strains due to racking of the frame. The extension 6 extends into the gear box 8. The propeller shaft 9 is provided with a worm 10 coacting with the worm gear 11 of the differential, illustrated more or less conventionally.

The worm 10 is provided with a housing 12 projecting from the gear box 8. The propeller shaft is arranged through the gear box and parallel with the shaft 5. The propeller shaft is provided with a gear 14, while the power shaft extension has a gear 15 splined thereto to be shifted into and out of mesh with the gear 14. This gear 15 is also adapted to mesh with the gear 16 on the stub shaft 17.

The pulley shaft 18 is arranged through a housing 19 in bearing 20 provided therefor on the gear box. This shaft 18 is provided with a pulley 21. The gear 16 also has a gear 22 connected thereto meshing with the gear 23 on the shaft 18, so that by shifting the gear 15 into mesh with the gear 14, the propeller is driven; by shifting it into mesh with the gear 16 the pulley shaft is driven.

By arranging the pulley shaft so that it is connected with the source of power through the variable speed gearing, the pulley shaft may be driven through the desired transmission speed which enables picking up or starting of a very heavy load on the pulley shaft. It is well understood that an engine is capable of driving certain loads which it is unable to start or to overcome the inertia.

By arranging the driving connections as I have illustrated and described the load may be picked up on low gear and various gear shifts made as may be desirable.

In the structure illustrated the shiftable gear 15 is adjusted from the shifting rod 24 which is arranged through the rear side of the gear box and provided with a suitable hand piece. This rod carries the forked arm 25 which engages the groove 26 of the gear 15, so that the gear 15 may be easily shifted as desired.

I have illustrated and described my improvements in the form in which I have embodied the same in practice. I have not attempted to illustrate or describe certain modifications and adaptations which I contemplate or which might be desirable to adapt my improvements to various conditions, as I believe the disclosure made will enable those skilled in the art to which my invention relates to embody or adapt the same as may be desired.

Having thus described my invention, what I claim as new and desire to secure by Letters Patent, is:

1. The combination of a variable speed gearing comprising a power shaft, a gear box, said power shaft being provided with an extension having a connection therewith permitting relative lateral movement disposed in said gear box, a driven shaft disposed through said gear box below said power shaft, a gear on said driven shaft, a pulley shaft disposed through said gear box above and transversely of said power shaft, a beveled gear on said pulley shaft, a pulley shaft driving gear having a beveled gear connected thereto and meshing with said pulley shaft gear, and a shiftable power gear splined upon said power shaft extension to be shifted into engagement with said driven shaft gear or with said pulley shaft driving gear.

2. The combination of a variable speed gearing comprising a power shaft, a gear box, said power shaft being extended into said gear box, a driven shaft disposed through said gear box below said power shaft, a gear on said driven shaft, a pulley shaft disposed through said gear box above and transversely of said power shaft, a beveled gear on said pulley shaft, a pulley shaft driving gear having a beveled gear connected thereto and meshing with said pulley shaft gear, and a shiftable power gear splined upon said power shaft to be shifted into engagement with said driven shaft gear or with said pulley shaft driving gear.

3. In a tractor, the combination of a power shaft, a gear box, said power shaft being provided with an extension having a connection therewith permitting relative lateral movement disposed in said gear box, a driven shaft disposed through said gear box below said power shaft, a gear on said driven shaft, a pulley shaft disposed through said gear box above and transversely of said power shaft, a beveled gear on said pulley shaft, a pulley shaft driving gear having a beveled gear connected thereto and meshing with said pulley shaft gear, and a shiftable power gear splined upon said power shaft extension to be shifted into engagement with said driven shaft gear or with said pulley shaft driving gear.

4. In a tractor, the combination of a power shaft, a gear box, said power shaft being extended into said gear box, a driven shaft disposed through said gear box below said power shaft, a gear on said driven shaft, a pulley shaft disposed through said gear box above and transversely of said power shaft, a beveled gear on said pulley shaft, a pulley shaft driving gear having a beveled gear connected thereto and meshing with said pulley shaft gear, and a shiftable power gear splined upon said power shaft to be shifted into engagement with said driven shaft gear or with said pulley shaft driving gear.

5. The combination of a variable speed gearing comprising a power shaft, a driven shaft, a gear on said driven shaft, a pulley shaft disposed transversely of said power shaft, a beveled gear on said pulley shaft, a pulley shaft driving gear having a beveled gear connected thereto and meshing with said pulley shaft gear, and a shiftable power gear splined upon said power shaft to be shifted into engagement with said driven shaft gear or with said pulley shaft driving gear.

6. In a tractor, the combination of a power shaft, a driven shaft, a gear on said driven shaft, a pulley shaft disposed transversely of said power shaft, a beveled gear on said pulley shaft, a pulley shaft driving gear having a beveled gear connected thereto and meshing with said pulley shaft gear, and a shiftable power gear splined upon said power shaft to be shifted into engagement with said driven shaft gear or with said pulley shaft driving gear.

7. The combination of a variable speed and reverse gearing, a driven shaft, a pulley shaft disposed transversely of said driven shaft, a gear on said driven shaft, a pulley shaft driving gear having driving connections with said pulley shaft, and a shiftable power gear adapted to be engaged with said driven shaft gear or with said pulley shaft driving gear.

In witness whereof, I have hereunto set my hand and seal in the presence of two witnesses.

JESSE C. SIMMONS. [L. S.]

Witnesses:
Geo. N. Bevier,
May Haney.